United States Patent [19]

Kummer

[11] Patent Number: 4,727,959
[45] Date of Patent: Mar. 1, 1988

[54] ASSEMBLY OF LARGE STRUCTURES

[75] Inventor: Karl-Heinz Kummer, Stuhr, Fed. Rep. of Germany

[73] Assignee: Erno Raumfahrttechnik GmbH, Bremen, Fed. Rep. of Germany

[21] Appl. No.: 22,782

[22] Filed: Mar. 6, 1987

[30] Foreign Application Priority Data

Mar. 7, 1986 [DE] Fed. Rep. of Germany ....... 3607507

[51] Int. Cl.$^4$ .......................... B64G 5/00; E04G 1/24; E04G 1/15
[52] U.S. Cl. ....................................... 182/36; 182/115; 182/128; 182/130; 182/187
[58] Field of Search ............... 182/128, 187, 130, 131, 182/132, 179, 178, 36, 115

[56] References Cited

U.S. PATENT DOCUMENTS

| 1,921,631 | 8/1933 | Miller | 182/130 |
| 1,974,572 | 9/1934 | Laflin | 182/39 |
| 2,337,674 | 12/1943 | Miller | 182/131 |
| 3,998,292 | 12/1976 | Holterbosch | 182/130 |
| 4,407,392 | 10/1983 | Lazzari | 182/128 |
| 4,596,096 | 6/1986 | Heath | 182/132 |

FOREIGN PATENT DOCUMENTS 768910 10/1980 U.S.S.R. .................... 182/187

Primary Examiner—Reinaldo P. Machado
Attorney, Agent, or Firm—Ralf H. Siegemund

[57] ABSTRACT

Assembly equipment for rocket stages or other large structures includes three towers arranged on a circle and being circumscribed by a plurality of platforms; another platform ring is held in different levels on an inside circle, and a spiral structure is coaxially mounted for rotation on a circular track to permit access to every part of the centrally positioned structure to be assembled. An arch shaped bridge may span the top part; multiple equipment may be axially superimposed.

4 Claims, 5 Drawing Figures

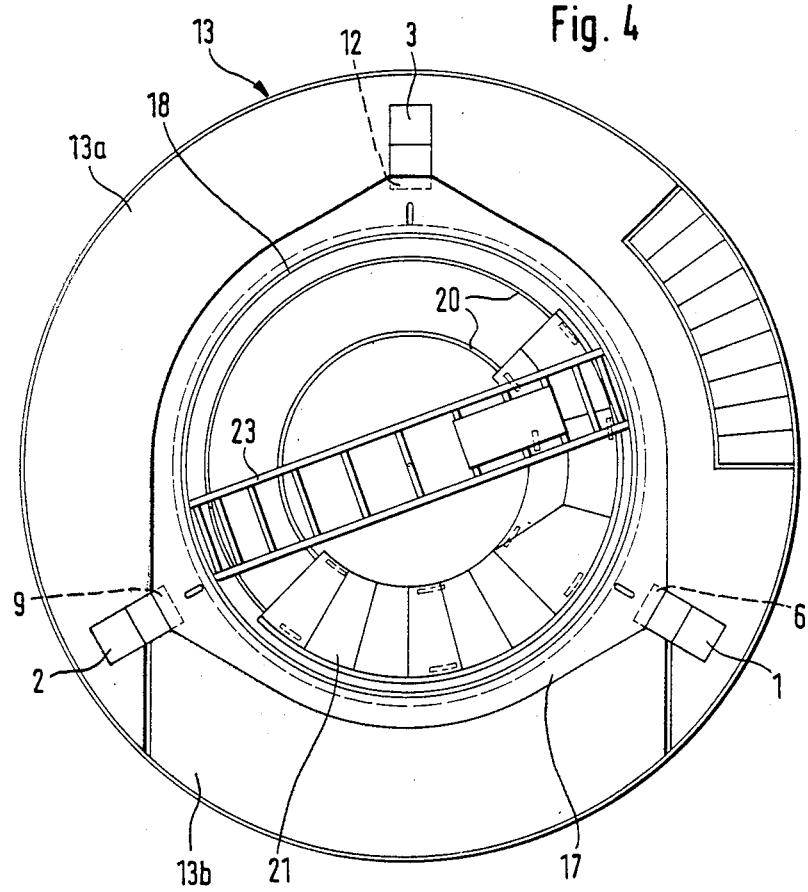

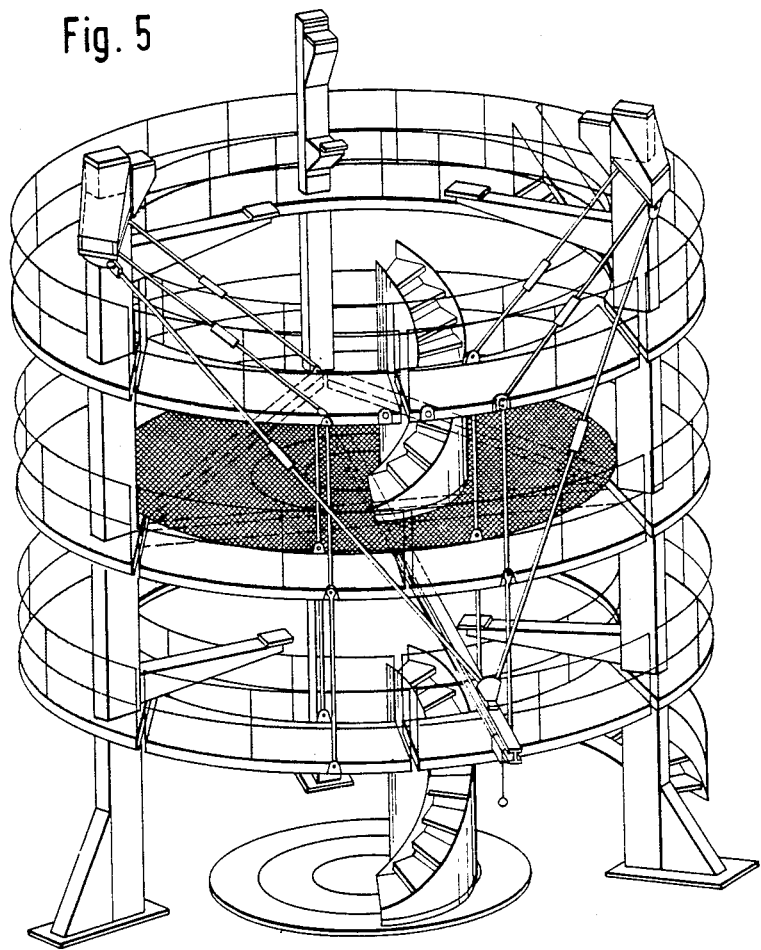

ASSEMBLY OF LARGE STRUCTURES

BACKGROUND OF THE INVENTION

The present invention relates to equipment for the assembly of large and large scale structures including an integration stand for the assembly of rocket stages and being configured as a multi-story scaffolding, frame, tower, or the like.

Devices and equipment of the kind to which the invention pertains are already known and have been used with success and in a variety of configurations. One can call them assembly towers or assembly scaffolds, and they serve for the assembly of the individual components of a rocket stage. Following the assembly, the assembled stage is subjected to certain tests, including function tests right in that assembly facility. These tests should generally be conducted under highly controlled environmental conditions, including particular air cleanliness, a controlled moisture content, and so forth. The known assembly devices, however, are disadvantaged by the fact that frequently the tower, frame, or scaffolding tightly surrounds the structure and impedes for example, the conduction of wires, conduits, or the like. Moreover, in such a scaffold tower or frame, a plurality of assembly planes or platform levels have to be provided for in order to ensure good accessibility to all of the various parts of the structure that require work.

DESCRIPTION OF THE INVENTION

It is an object of the present invention to provide a new and improved rocket assembly tower, scaffold, frame, or the like, which permits easy access to various parts of the structure to be assembled even under tightest space requirements and without impeding, for example, the connection of conduits, conductors, or the like, including connections between the structure itself and the periphery in general. Moreover, the assembly equipment should be constructed rather simply and be inexpensive.

In accordance with the preferred embodiment of the present invention, it is suggested to provide at least three annularly arranged columns or towers, being provided with support structures (projections) and being circumscribed by annular platforms or platform levels. There should be at least one assembly ring fastened to the columns or towers on the inside, and a spirally configured staircase can be moved in the interior of the circle delineated by the columns or towers, along a circular path.

The assembly device in accordance with the invention offers sufficient work space to the personnel conducting the assembly without large technical expenditure, but permits working everywhere and over the entire height in vertical dimension of the structure being assembled. The circumscribing work platforms should be sectionalized to permit folding away of portions so that large scale structure parts can be shifted laterally into the assembly equipment. The upper mounting ring may additionally be bridged by a curved ladder. The assembly equipment can be used in the plurality in a vertically, axially stacked configuration.

DESCRIPTION OF THE DRAWINGS

While the specification concludes with claims particularly pointing out and distinctly claiming the subject matter which is regarded as the invention, it is believed that the invention, the objects and featurs of the invention, and further objects, features, and advantages thereof will be better understood from the following description taken in connection with the accompanying drawings in which:

FIG. 4 illustrates the arrangement shown in FIGS. 2 and 3 in top elevation; and

FIG. 5 illustrates two assembly equipments of the type shown in FIG. 1 arranged one above the other for a two plane integration stand.

Proceeding now to the detailed description of the drawings, FIG. 1 illustrates assembly equipment for integrating, i.e. assembling, rocket stages. This equipment includes three columns or towers 1, 2, and 3, which are firmly anchored in the ground. They are actually equidistantly spaced, i.e. at a 120 degree spacing between them, and establish therewith a circle or a circular cylinder. Support devices 4 through 12 project radially inwardly from the towers or columns and in different levels thereof. All of the towers or columns are surrounded by three annular or ringshaped assembly platforms, 13, 14, and 15; as can specifically be seen in FIG. 4 they can be considered to be assembled from arc-shaped components or sections, shown in FIG. 4, for example, by reference numerals 13a and 13b, wherein one segment, such as 13a configured in a somewhat horseshoe-fashion, is firmly connected and secured to all three columns, 1, 2, and 3. The second component, for example, of the assembly annulus 13, and being denoted by 13b, is pivotably linked or hinged to the portion 13a. The same can be said for the two other assembly rings, 14 and 15. This pivoting is necessary to move laterally a rocket stage, such as 16, into the assembly structure, and in a concentric relation thereto.

Figure 1:
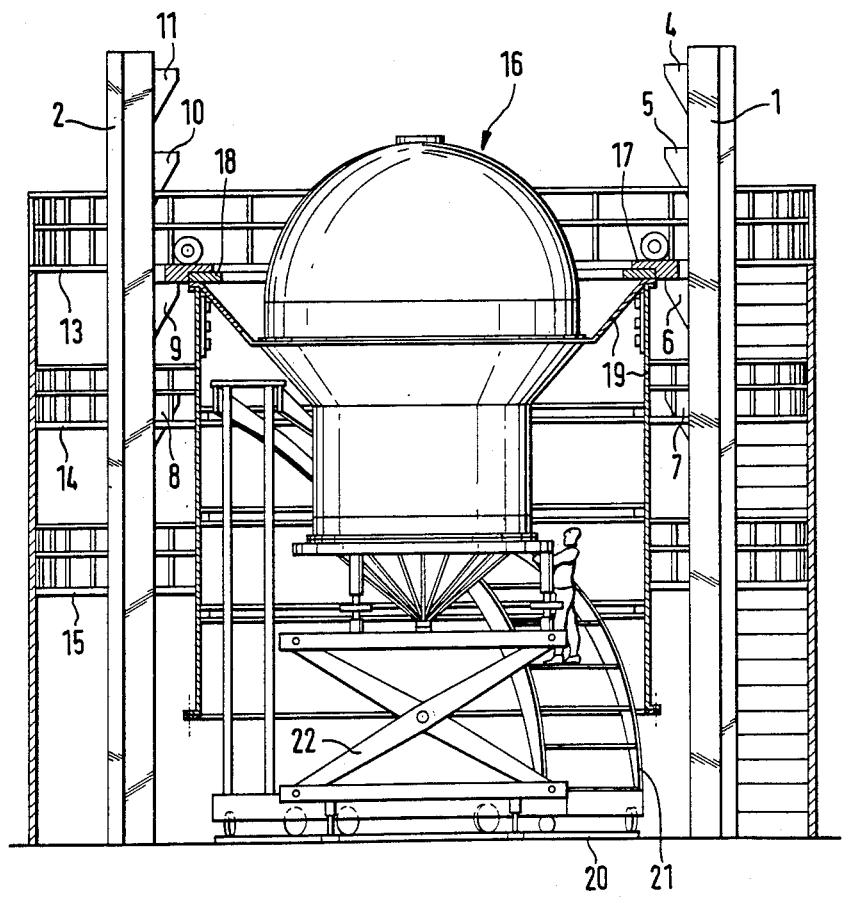
FIG. 1 is a somewhat schematical side view, partially in sections, of an assembly device and equipment constructed in accordance with the preferred embodiment of the present invention for practicing the best mode thereof.

Certain specific holding and supporting projections, namely 6, 9, and 12 project from these towers 1, 2, and 3 and they support an upper carrier 17. The other projections 5,10 etc. are provided for fastening the ring 17 in different levels. An assembly ring 18 is fastened to that carrier ring. This assembly ring 18, in turn, carries structure 19 provided for connecting to that rocket stage 16. The structure 19 circumscribes a cylinder and in the interior thereof is provided a spirally-shaped staircase 21. This spiral staircase is movable on a circular track 20 and can be latched in any position along that track. one can say that the spiral staircase can be turned on the center axis of the spiral, which axis traverses the center of circular track 20.

FIG. 1 illustrates in addition a lift platform 22 which serves for the temporary support of components of the rocket stage 16 until these components are fixed to the basic structure to be assembled. The lifting stage 22 is not, by and in itself, part of the inventive structure, it is merely shown that such an auxiliary structure can be accommodated with relative ease by and in the inventive structure.

Figure 2:
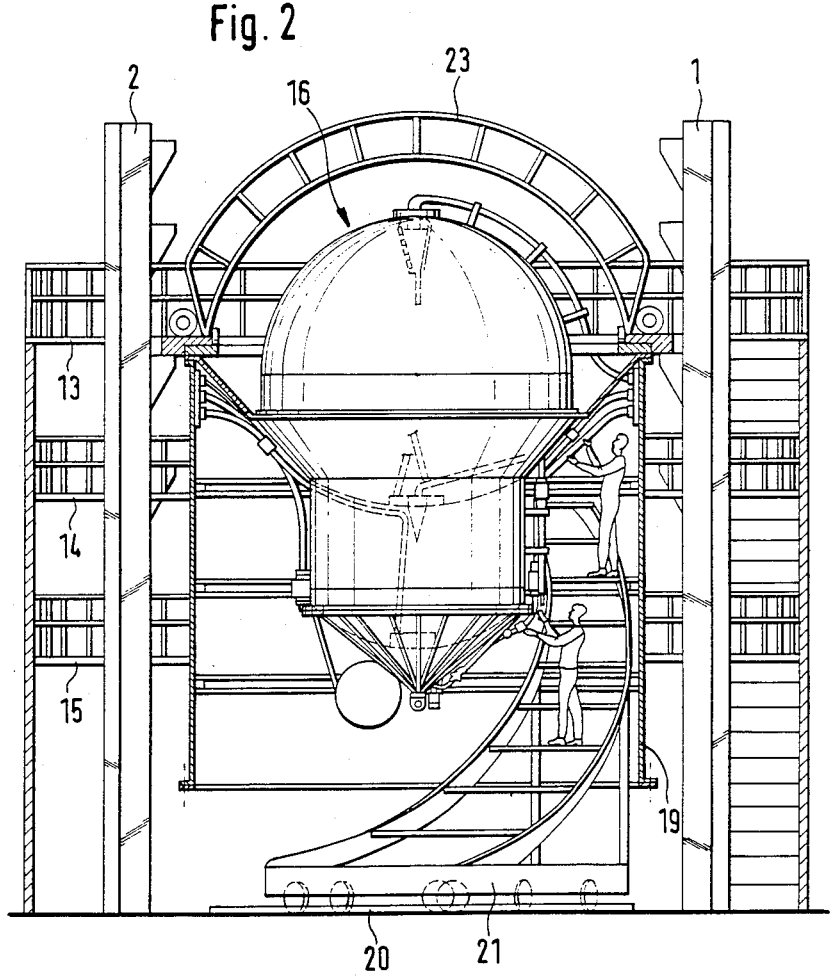
FIGS. 2 and 3 illustrate a similar equipment with a supplemental feature.
Figure 3:
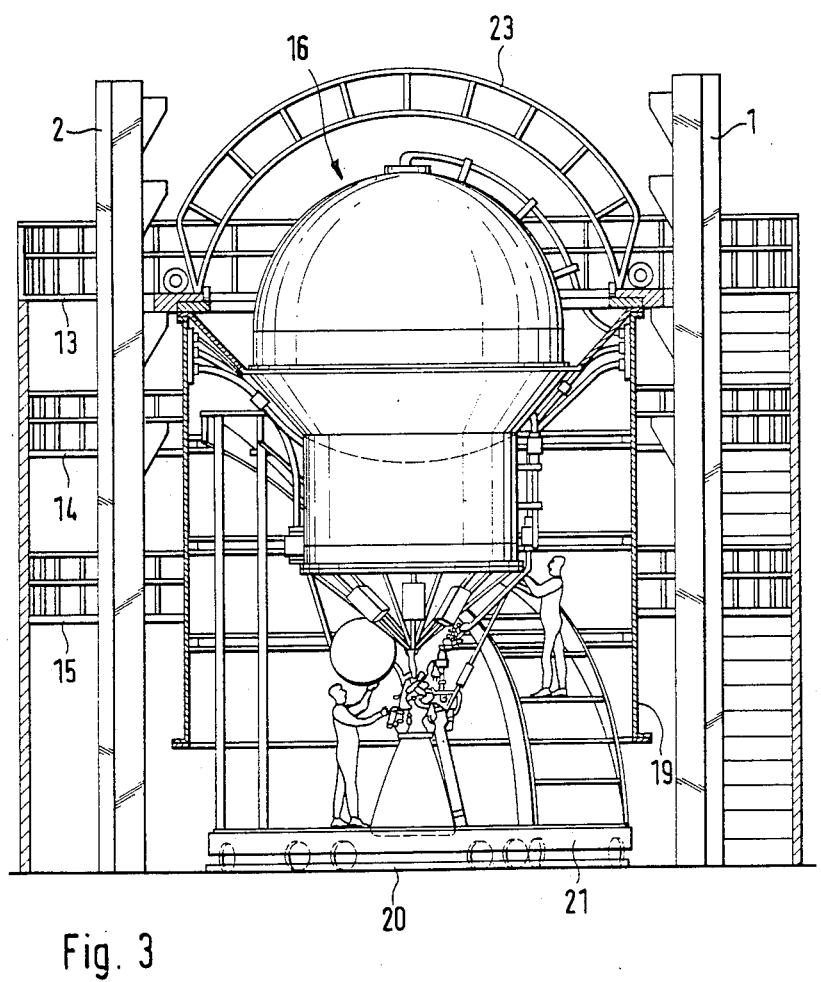

The assembly construction shown in FIGS. 2, 3, and 4 has many of the components used in this construction shown in FIG. 1 and are identified by similar reference numerals. However, in addition, FIGS. 2, 3, and 4 show a curved or arch-shaped ladder 23, which runs also on a circular track, which, in turn, is mounted to the assembly ring 18. This supplemental feature permits better working in, on, or near the top part of the rocket stage 16.

FIGS. 2, and 3, moreover, illustrate how, in fact, the various positions of the spiral staircase 21 on the circular track 20 renders practically every position of the rocket stage 16 equally well accessable. This is particular so, as the conventional assembly platforms are not being needed in the internal zone of the assembly construction, i.e. in the immediate vicinity of and around the structure being assembled. The various assembly platforms 13, 14, and 15 are limited to the outer zone, and particularly will not impede movement of the spiral staircase 21 around the circular track 20. As stated, the staircase 21 can be latched in any of the positions on the circular track and path 20.

FIG. 5 is, in fact, a superimposed structure in a sense that two devices of the kind shown in FIGS. 1, 2, 3, and 4 are placed one above each other. This then establishes a two-level integration stand which permits, if so desired, independently working in two different levels, either on one larger structure, or on two structures which are, say, first assembled separately, and then combined in this superimposing relationship. It can readily be seen that more than two such assembly configurations can be combined in ananomous fashion.

The invention is not limited to the embodiments described above, but all changes and modifications thereof not constituting departures from the spirit and scope of the invention are intended to be included.

What is claimed is:

1. Device for assembling large or large scale structures, particularly rocket stages, comprising:
    at least three columns or towers arranged on a circle and being provided with radially inwardly extending support projections;
    a plurality of vertically spaced assembly annuli circumscribing said towers in concentric relationship;
    an annular assembly ring mounted on particular ones of the support projection on the inside of a circle delineated by said towers or columns; and
    a spiral staircase looping around a particular axis and mounted for running on a circular track that extends around said axis.

2. Device as in claim 1, there being in addition an arch-shaped ladder mounted on said inside assembly ring.

3. Device as in claim 1, wherein said annular assembly ring is bi-parted, one of the respective parts being pivotably hinged to the other one so that the interior space as delineated by the towers, or columns is laterally accessible.

4. A plurality of devices as per claim 1 being mounted in axial superimposed relationship.

* * * * *